2,738,347

PENICILLIN SALT OF BENZHYDRYL-PHENETHYLAMINE

Jack Bernstein and Kathryn A. Losee, New Brunswick, N. J., assignors to Olin Mathieson Chemical Corporation, New York, N. Y., a corporation of Virginia No Drawing. Application December 13, 1954,
Serial No. 474,978

2 Claims. (Cl. 260—239.1)

This invention relates to derivatives of N-benzhydryl-phenethylamine, and more particularly to penicillin salts of N-benzhydryl-phenethylamine.

For penicillin therapy by parenteral administration, there has been a constant search for a form of penicillin which, upon intramuscular injection, possesses the desirable depot action. In order to be thus utilizable, the penicillin form must have a particular low but appreciable solubility in the body fluids.

We have now found that the N-benzhydryl-phenethylamine salt of a penicillin, especially of penicillin G, is a form of penicillin which fufills the above requirements. This salt is less soluble than either the procaine or the N-benzyl-phenethylamine salts of penicillin, for example, and yet is sufficiently soluble to be utilizable for penicillin therapy by intramuscular administration.

The salt of N-benzhydryl-phenethylamine and a penicillin may be obtained by the process of this invention, which essentially comprises reacting either (a) the free base, N-benzhydryl-phenethylamine with a penicillin or (b) an acid addition salt of N-benzhydryl-phenethylamine with a water-soluble salt of a penicillin (e.g. an ammonium, alkali metal or alkaline earth metal salt) in a suitable solvent. When the free base is used as a reactant, the process is preferably carried out in an organic solvent for the reactants, such as ether, using penicillin acid as the second reactant. When an acid-addition salt of the amine and a salt of penicillin are employed as the reactants, the reaction is preferably effected in an aqueous medium (such as water alone or a mixture of a water-miscible organic solvent and water). The reactants are preferably employed in equivalent amounts.

Suitable acid-addition salts of N-benzhydryl-phenethylamine for use in the process of this invention include inorganic acid salts (e.g., hydrochloride, hydrobromide, sulfate, sulfamate, phosphate, and nitrate) and organic acid salts (e. g. acetate, lactate, succinate, citrate, salicylate and tartrate). The only limitation on the nature of the acid moiety is that the salt formed thereby with the amine be appreciable more soluble in the reaction medium than is the resulting penicillin salt of the amine. The particularly preferred inorganic acid is sulfamic acid, and the particularly preferred organic acid is acetic acid.

Among the penicillin reactants which may be employed in the process of this invention are the free acid form, the ammonium salts, the alkali metal salts (e.g. sodium and potassium salts) and alkaline earth metal salts (e. g. calcium salt) of the penicillin (especially penicillin G, although penicillin X, penicillin K, and dihydropenicillin F can also be used). One of these penicillin reactants is reacted with the N-benzhydryl-2-phenylethylamine (or acid-addition salt thereof), in a 1:1 molar ratio, to yield the N-benzhydryl-phenethylamine salt of the penicillin, which either forms as a precipitate or is readily precipitated and is then removed from the reaction mixture by filtration or centrifugation.

The resulting N-benzhydryl-phenethylamine salt of a penicillin is utilizable in the treatment of infections susceptible to penicillin therapy. The salt may be formulated for this purpose in various ways, inter alia: tablets, oral suspensions, or other pharmaceutical compositions for oral administration; and in an aqueous or oil composition for intramuscular administration. Thus, the penicillin salt of N-benzhydryl-phenethylamine may be formulated for prolonged action in an intramuscular oil depot preparation, if desired, in conjunction with procaine penicillin G and/or with a water-soluble salt of penicillin G (e.g. potassium penicillin G).

The following are illustrative of other intramuscular compositions of the penicillin salt of this invention useful as systemic anti-infectives of prolonged-action, the penicillin G salt of N-benzhydryl-phenethylamine being designated as "agent" in the formulations:

A. Agent _____u__ 150,000 or 300,000
   Procaine penicillin G _____u__ 150,000 or 300,000
   Aluminum monostearate __mg__ 20
   Peanut (or sesame) oil, q. s_cc__ 1
B. Agent _____u__ 300,000 or 600,000
   Streptomycin (as base) ___mg__ 250 or 500
   Dihydrostreptomycin (as base)
                           mg__ 250 or 500
   Water (for injection; containing
     a dispersing or suspending
     agent), q. s_____cc__ 1
C. Agent _____u__ 300,000 or 600,000
   Hydrophilic colloid (e. g., sodium carboxy-methyl cellulose) _____mg__ 1 to 5
   Surface-active agent (e. g. tween 80) _____mg__ 1.25

Composition C can be supplied as is (i. e. in dry form), for reconstitution with water for injection to total volume of 1 cc.; or the composition can be supplied as a preformed suspension with an aqueous vehicle containing a suitable suspending agent (such as lecithin).

Being substantially tasteless and not highly susceptible to destruction by gastric juice, the penicillin G salt of N-benzhydryl-phenethylamine is also advantageously utilizable for penicillin therapy by the oral route. For this purpose, it may be incorporated in tablets (100,000 or 200,000 units, with conventional tablet excipients but without added buffers to counteract gastric acidity); or it may be made into a flavored aqueous suspension containing 60,000 units/cc.

The following examples are illustrative, but by no means imitative, of the invention.

EXAMPLE 1

*N-benzhydryl-phenethylamine*

(a) N-BENZHYDRYLIDENE-PHENETHYLAMINE

A solution of 182 grams (1.0 mole) of benzophenone and 121 grams (1.0 mole) of phenethylamine in 500 cc. of benzene containing 0.5 gram of p-toluene-sulfonic acid is refluxed for three days. The water formed during the reaction is removed as formed by means of a Dean-Stark trap. The benzene is then removed by distillation and the residue fractionally distilled under reduced pressure. The main fraction, boiling at 175–182° C. at 0.3 mm. pressure, weighs about 220 grams, corresponding to a yield of about 77%.

(b) N-BENZHYDRYL-PHENETHYLAMINE

To a solution of 114 grams (0.4 mole) of N-benzhydrylidene-phenethylamine in 150 ml. of absolute ethanol there is added one gram of catalyst (5% palladium on charcoal) and the suspension shaken in a Parr hydrogenation apparatus at a pressure of 50 lb. hydrogen and at a temperature of 40–50°. The theoretical absorption of hydrogen is complete at the end of one hour. The suspension is then cooled, filtered to remove the catalyst and concentrated under reduced pressure to yield N-benzhydrylphenethylamine, i. e.

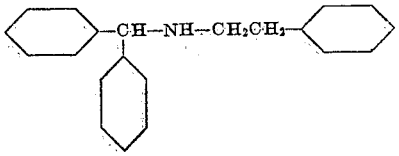

as a white solid melting at about 47–48° C.

Acid-addition salts of N-benzhydryl-phenethylamine are obtained as illustrated by the following examples.

EXAMPLE 2

*N-benzhydryl-phenethylamine hydrochloride*

110 g. of the base (prepared in Example 1) is dissolved in 1 liter of anhydrous ether. To this solution there is added an ethereal solution of hydrogen chloride until the solution is acid to Congo red paper. The crystalline solid is filtered and washed with ether to yield about 117 grams of the hydrochloric melting at 252–253° with decomposition.

Analysis.—Calcd. for $C_{21}H_{21}N.HCl$: N, 4.32; Cl, 10.94. Found: N, 4.54; Cl, 10.76.

EXAMPLE 3

*N-benzhydryl-phenethylamine acetate*

To a solution of 2.87 g. (0.01 mole) N-benzhydryl-phenethylamine in 25 cc. anhydrous ether is added 0.6 g. (0.01 mole) glacial acetic acid. The crystalline precipitate is filtered and washed with ether; M. P. about 99–100° C.

EXAMPLE 4

*N-benzhydryl-phenethylamine sulfate*

To a solution of 2.87 g. (0.01 mole) N-benzhydryl-phenethylamine in 25 cc. absolute alcohol is added 0.49 g. (0.005 mole) concentrated sulfuric acid with cooling. The crystalline solid which precipitates immediately is filtered. M. P. about 214–215° C.

EXAMPLE 5

*N-benzhydryl-phenethylamine lactate*

To a solution of 2.87 g. (0.01 mole) N-benzhydryl-phenethylamine in 25 cc. dry ether is added 1.06 g. (0.01 mole) 85% lactic acid. An oil separates which crystallized on standing. M. P. about 126–127° C.

EXAMPLE 6

*N-benzhydryl-phenethylamine sulfamate*

To a solution of 2.87 g. (0.01 mole) N-benzhydryl-phenethylamine in 20 cc. of absolute alcohol is added 0.97 g. (0.01 mole) sulfamic acid in 50 cc. of 90% alcohol. After the addition of approximately 30 cc. of ether, the desired salt crystallizes. M. P. about 157–158° C.

Penicillin G salts of N-benzhydryl-phenethylamine are prepared as illustrated in the following examples.

EXAMPLE 7

*The pencillin G salt of N-benzhydryl-phenethylamine*

To a suspension of 16.1 grams (0.05 mole) of N-benzhydryl-phenethylamine hydrochloride in 500 ml. of water there is slowly added over a period of 30 minutes a solution of 18.6 grams (0.05 mole) of potassium penicillin G in 150 ml. of water. The mixture is stirred for seven hours at room temperature, and then filtered to give the desired salt. The salt melts at about 111–112° C.

Analysis.—Calcd. for $C_{21}H_{21}N.C_{16}H_{18}N_2O_4S_2$: N, 6.75. Found: N, 6.99.

The salt has a potency of about 918 units/mg. and a solubility in water of about 0.2 mg./ml.

EXAMPLE 8

A solution of 372 mg. (0.001 mole) potassium penicillin G in 10 cc. water is added to a solution of 384 mg. N-benzhydrylphenethylamine sulfamate in 40 cc. water. The crystalline solid which precipitates immediately is filtered and dried. Weight about 555 mg. M. P. about 110–112°.

EXAMPLE 9

A solution of 372 mg. of potassium penicillin G in 10 cc. water is added to a solution of N-benzhydryl-phenethylamine sulfamate in 2 cc. dimethylformamide. The crystalline precipitate which forms immediately is filtered and dried. Wt. about 620 mg. M. P. about 111–112°.

EXAMPLE 10

A solution of 372 mg. of potassium penicillin G in 10 cc. water is added to a solution of 324 mg. N-benzhydrylphenethylamine hydrochloride in 10 cc. dimethylformamide. After the addition of 30 cc. water to the resulting solution, a crystalline solid precipitates. Wt. about 560 mg. M. P. about 111–112° C.

EXAMPLE 11

A solution of 372 mg. of potassium penicillin G in 10 cc. water is added to a solution of 324 mg. N-benzhydryl-phenethylamine hydrochloride in 15 cc. formamide. After the addition of 30 cc. water to the resulting solution, a crystalline solid precipitates. Wt. about 490 mg. M. P. about 111–112° C.

EXAMPLE 12

A solution of 372 mg. potassium penicillin G in 5 cc. water is added to a solution of 384 mg. N-benzhydrylphenethylamine sulfamate in 5 cc. 95% alcohol (warm). After the further addition of 5 cc. water, a crystalline solid precipitates. Wt. about 620 mg. M. P. about 111–112° C.

EXAMPLE 13

A solution of 3.34 grams (0.01 mole) of penicillin G in 100 ml. of amyl acetate (obtained by extraction of an acidified aqueous solution of 3.72 grams of the potassium salt) is added to a solution of 2.87 grams (0.01 mole) of N-benzhydryl-phenethylamine in 50 ml. of amyl acetate. There is no immediate precipitation of the salt, and about 150 ml. of anhydrous hexane is added to precipitate the desired salt. It is filtered and washed with hexane.

If ether is substituted for the amyl acetate solvent, then no addition of hexane is required to precipitate the salt.

In a similar manner, the N-benzhydryl-phenethylamine salts of other penicillins (e. g. penicillin X, penicillin K, and dihydropenicillin F) can be prepared, by substituting the potassium salt of the particular penicillin for the potassium salt of penicillin G in the foregoing examples.

The invention may be variously otherwise embodied within the scope of the appended claims.

We claim:

1. A salt of penicillin and N-benzhydryl-phenethylamine.

2. The penicillin G salt of N-benzhydryl-phenethylamine.

References Cited in the file of this patent

UNITED STATES PATENTS 2,585,432    Buckwalter _____ Feb. 12, 1952

FOREIGN PATENTS 1,065,593    France _____ Jan. 13, 1954